Patented Dec. 9, 1941

2,265,173

UNITED STATES PATENT OFFICE 2,265,173

COMPOSITION OF MATTER

Toivo A. Kauppi and Roger W. Kolderman, Midland, Mich., assignors to The Dow Chemical Company, Midland, Mich., a corporation of Michigan No Drawing. Application May 2, 1940,
Serial No. 332,988

8 Claims. (Cl. 106—177)

This invention relates to a transparent, colorless composition adapted to be coated onto sheet material or made into films without the use of solvents.

It is an object of the present invention to provide a composition which may be coated onto sheet material in the molten state to yield weather-resistant coated articles.

A further object is to provide a molten coating composition which will give clear, substantially colorless, light-stable protective coatings and films.

We have found that the following composition comprising the stated ingredients within the recited proportions by weight may be utilized in the molten condition for providing a permanently colorless weather-resistant transparent coating for paper and the like, or may be cast in the molten condition to form free, self-supporting films which may be applied to the surfaces of articles to provide protective coatings therefor:

|  | Broad | Preferred |
|---|---|---|
|  | Percent by weight | Percent by weight |
| Ethyl cellulose | 20-45 | 40-45 |
| Hard plasticizer | 25-65 | 25-55 |
| Soft plasticizer | 5-30 | 5-30 |

The composition may be diluted slightly by the addition of up to 10 per cent, based on the weight of the named ingredients, of a colorless, heat-stable, compatible material such as an ester-type wax, as for example, bleached beeswax or 12-hydroxy stearin. It is desirable to add a waxy diluent when compositions having a high degree of water impermeability are required.

In the said composition, ethyl cellulose is the film-forming ingredient which gives toughness to articles made therefrom. It is preferred to use a low viscosity type of ethyl cellulose. The plasticizer ingredients behave as solvents for the ethyl cellulose, the composition being a flowable solution when hot and capable of being cast as films on a supporting surface or being coated onto sheet material by means of hot-melt coating machinery without the use of volatile solvents. When cold, the composition is non-tacky and non-blocking and this property coupled with its transparent, colorless, stable nature makes it capable of use in many of the fields where clear, colorless lacquers or transparent films are at present used. In all its applications, the expense and the fire and health hazards attending the use of solvents are avoided.

The terms "hard plasticizer" and "soft plasticizer" are herein employed to designate plasticizers which, under standard test conditions, form ethyl cellulose compositions having hardness indexes respectively above 110 and below 95. "Hardness index" of ethyl cellulose compositions is the yield point hardness of the composition, expressed as a per cent relation to the yield point hardness of unplasticized ethyl cellulose. For standard comparisons, hardness index is determined and reported on the basis of compositions consisting of 100 parts of ethyl cellulose and 15 parts of the particular plasticizer. The method of determining hardness from the yield point on load-elongation curves is described by one of the present inventors and another, in Industrial and Engineering Chemistry, vol. 29, pp. 678-86 (1937). According to the above definition of hardness index, then, a hard plasticizer for use in the present invention, is one of which 15 parts can be added to 100 parts of ethyl cellulose and cast to form films having a yield point which is at least 110 per cent that of unplasticized ethyl cellulose. In the claims, such a plasticizer is, for brevity, said to be one having a hardness index rating in ethyl cellulose above 110. Similarly, a soft plasticizer, as the term is here employed, is the one which, in the same concentration, gives ethyl cellulose compositions having a yield point of not to exceed 95 per cent that of the unplasticized ethyl cellulose. Such a plasticizer is here referred to as one having a hardness index rating in ethyl cellulose of less than 95.

The term "plasticizer" is employed in its well-known sense to signify compounds which improve the ability of ethyl cellulose to flow under pressure at elevated temperature without materially detracting from the flexibility of the ethyl cellulose at room temperature. Plasticizers are thus distinguished from resins, all of which have a tendency to reduce the low temperature flexibility of ethyl cellulose unduly, even though many of them may improve the flow characteristics at elevated temperatures.

Suitable hard plasticizers for incorporation in the compositions of the present invention include: 5-tertiary-butyl-2-xenyl di-(4-tertiarybutylphenyl) phosphate, di-(4-tertiarybutylphenyl) mono-(5-tertiarybutyl-2-xenyl) phosphate, and tri-(5-tertiaryoctyl-2-xenyl) phosphate, as described in the co-pending application of one of the inventors and others, Serial No. 284,954, filed July 17, 1939 now U. S. Patent No. 2,224,847; chlorinated polyphenyl containing 65 per cent chlorine, sold as Aroclor 4465; hexabromophenyl diphenyloxide; tetrabromophenyl diphenyloxide, and hexabromodiphenyloxide as described in U. S. Patent 2,189,338; and certain hydroaromatic diaryl ethers, whose compositions with ethyl cellulose are described in U. S. Patent 2,189,337. In the latter patent, the plasticizers designated as numbers 3, 5, 6, 7, 12, 13, 14, 18, 19 and 20 give ethyl cellulose compositions of hardness index over 110. These plasticizers are, respectively, cyclohexyl diphenyl ether containing 1.8, 4, 6, and 6 cyclohexyl groups per mol, cyclohexyl phenyl diphenyl ether containing 1.5, 3 and 3.5 cyclohexyl groups per mol, di-(phenylcyclohexyl) phenyl ether, di-(3-cyclohexyl cyclohexyl) phenyl ether, and di-(3-methyl cyclohexyl) phenyl ether. All these plasticizers give hard but flexible colorless films when incorporated with ethyl cellulose.

The choice of soft plasticizers, i. e. plasticizers of hardness index rating less than 95, is very large. The majority of the available plasticizers are of the softening type and include, for example, dibutyl phthalate, penta-chlorinated diphenyl (Aroclor 1254), monophenyl di-orthoxenyl phosphate, triphenyl phosphate, and many others.

We make our new compositions by heating the requisite amount of mixed plasticizers, with or without waxy diluent, at least to the melting point of ethyl cellulose, and stirring ethyl cellulose portionwise into the melt until dissolved.

Coatings are made on paper, metal foil, or other sheet material at temperatures between 300° F. and 400° F. by customary hot-melt coating means. The coatings are non-tacky, weather-resistant, water-proof and substantially colorless. If the coating contains about 10 per cent of an ester-type wax, it is also moisture-proof.

Modes of carrying out the present invention and some of the uses thereof are illustrated by the following examples:

*Example 1*

A number of melts were made containing the hereinafter stated ingredients:

| No. | Ethyl cellulose | Plasticizer name and percentage | | 12-hydroxy stearin |
|---|---|---|---|---|
| | | Hard | Soft | |
| | *Percent* | | | |
| 1 | 45 | Tetra-cyclohexyl diphenyl ether, 30%. | Monophenyl di-o-xenyl phosphate, 25%. | |
| 2 | 45 | Tetra-cyclohexyl diphenyl ether, 35%. | Aroclor 1254, 20%. | |
| 3 | 45 | Tetra-cyclohexyl diphenyl ether, 35%. | Monophenyl di-o-xenyl phosphate, 20%. | |
| 4 | 40 | 5-tert. butyl 2-xenyl di-(4-tert. butylphenyl) phosphate, 55%. | Monophenyl di-o-xenyl phosphate, 5%. | |
| 5 | 45 | Tetra-cyclohexyl diphenyl ether, 25%. | Aroclor 1254, 20%. | 10 |

All these melts were coated on paper using a roll coating machine and yielded non-tacky, clear, almost colorless coatings.

*Example 2*

A melt was prepared containing:

Per cent by weight
Ethyl cellulose, 10 cps. viscosity type _____ 45
Tetra-cyclohexyl diphenyl ether _____ 35
Aroclor 1254 _____ 20

This was cast as a thin film onto dextrin-coated paper and, after cooling, the surface of the film was printed with an ornamental design. A second hot-melt film was cast on the surface of the print. The composite film-coated paper was next pressed on a glass surface by means of a hot iron applied to the paper side. The film adhered firmly to the glass surface and, after cooling, the paper backing was stripped from it after soaking with water. A decorated glass article resulted which consisted of a glass base having indicia thereon sandwiched between a supporting ethyl cellulose composition film and a protective ethyl cellulose composition film.

Articles of the nature described in Example 2 are capable of many useful applications. They may be used for decorating glass screens or as display signs on show windows, automobile windows, etc. The weather-resistant, light-stable qualities of the films make them particularly useful for making outdoor display signs. The display signs may also be applied to supports other than glass. It is apparent that the dextrin-coated paper of the example may be substituted by paper coated with any hydrophilic colloid.

*Example 3*

A melt was made which contained:

Per cent by weight
Ethyl cellulose, 10 cps. viscosity type _____ 40
5 - Tertiarybutyl-2-xenyl di-(4-tertiarybutylphenyl) phosphate _____ 55
Monophenyl di-ortho-xenyl phosphate _____ 5

This was cast onto dextrin-coated paper giving a supported film which could be applied to a wide variety of surfaces, for example, colored posters, by a hot ironing operation, giving protection thereto.

The ease of application as a melt, the flexibility of the deposited film, and the non-tacky nature thereof at room temperature as well as its heat-sealing qualities, all make the present compositions useful for a wide variety of purposes. In many of the fields of use to which the compositions may be put, it is preferred to employ them in a colorless and transparent form, though it is to be understood that dyes or pigments may be added to produce special effects if desired. The presence of such coloring agents is not meant to be excluded by the language of the annexed claims.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A composition of matter adapted to be handled as a melt, containing at least 90 per cent of a homogeneous mixture consisting of from 30 to about 45 per cent of ethyl cellulose, from 25 to 65 per cent of a plasticizer selected from the group consisting of tertiary alkyl substituted triaryl phosphates, polybromo-diaryl ethers, and polyhydroaromatic diaryl ethers which have a hardness index rating in ethyl cellulose greater than 110, and from 5 to 30 per cent of a plasticizer of hardness index rating in ethyl cellulose less than 95, and when the above-named ingredients constitute less than 100 per cent of the composition, the balance is essentially an ester-type wax in amount not to exceed about 10 per cent of the whole.

2. A composition of matter adapted to be handled as a melt consisting essentially of from 30 to about 45 per cent of ethyl cellulose, from 25 to 65 per cent of a plasticizer selected from the group consisting of tertiary alkyl substituted triaryl phosphates, polybromo-diaryl ethers, and polyhydroaromatic diaryl ethers which have a hardness index rating in ethyl cellulose greater than 110, and from 5 to 30 per cent of a plasticizer of hardness index rating in ethyl cellulose less than 95, and up to 10 per cent of an ester-type wax.

3. A composition as claimed in claim 1, wherein the plasticizer of hardness index rating greater than 110 is a hydroaromatic diaryl ether.

4. A composition as claimed in claim 1, wherein the plasticizer of hardness index rating greater than 110 is a cyclohexylated diphenyl ether.

5. A composition as claimed in claim 1, wherein the plasticizer of hardness index rating greater than 110 is 5-tertiarybutyl-2-xenyl di-(4-tertiarybutylphenyl) phosphate.

6. A composition as claimed in claim 1, wherein the plasticizer of hardness index rating less than 95 is monophenyl di-orthoxenyl phosphate.

7. A composition as claimed in claim 1, wherein the plasticizer of hardness index rating greater than 110 is a cyclohexylated diphenyl ether and that of hardness index rating less than 95 is monophenyl di-orthoxenyl phosphate.

8. A composition as claimed in claim 1, wherein the plasticizer of hardness index rating greater than 110 is 5-tertiarybutyl-2-xenyl di-(4-tertiarybutylphenyl) phosphate and that of hardness index rating less than 95 is monophenyl di-orthoxenyl phosphate.

TOIVO A. KAUPPI.
ROGER W. KOLDERMAN.